United States Patent

[11] 3,610,712

| [72] | Inventor | James W. Endress |
| | | Syracuse, N.Y. |
| [21] | Appl. No. | 879,018 |
| [22] | Filed | Nov. 24, 1969 |
| [45] | Patented | Oct. 5, 1971 |
| [73] | Assignee | Carrier Corporation |
| | | Syracuse, N.Y. |

[54] BEARING STRUCTURE WITH RESERVE OIL SUPPLY
2 Claims, 5 Drawing Figs.

| [52] | U.S. Cl. | 308/124 |
| [51] | Int. Cl. | F16c 33/04 |
| [50] | Field of Search | 308/122, 131, 245, 124; 415/112, 111 |

[56] References Cited
UNITED STATES PATENTS
1,376,094   4/1921   Holtorp............. 308/131

Primary Examiner—Martin P. Schwadron
Assistant Examiner—Frank Susko
Attorneys—Harry G. Martin, Jr. and J. Raymond Curtin ABSTRACT: A bearing structure for a high-speed shaft carrying a substantial load. Opposite sides of the bearing bore are provided with radial enlargements connected by a relief passage formed in the upper half of the bore. An oil reservoir is mounted above the bore and has communication with the passage. The bearing is supplied with oil under pressure maintaining a high level in the reservoir, providing a supply of oil in the event of oil pressure failure.

PATENTED OCT 5 1971 3,610,712
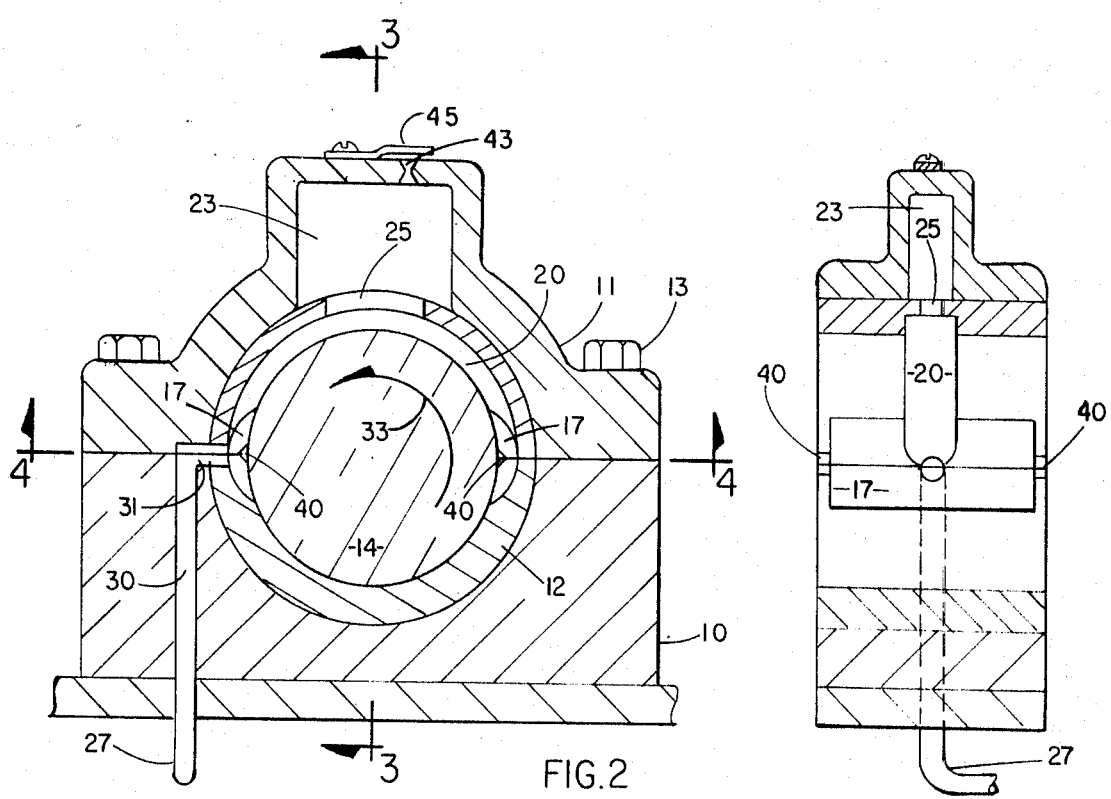
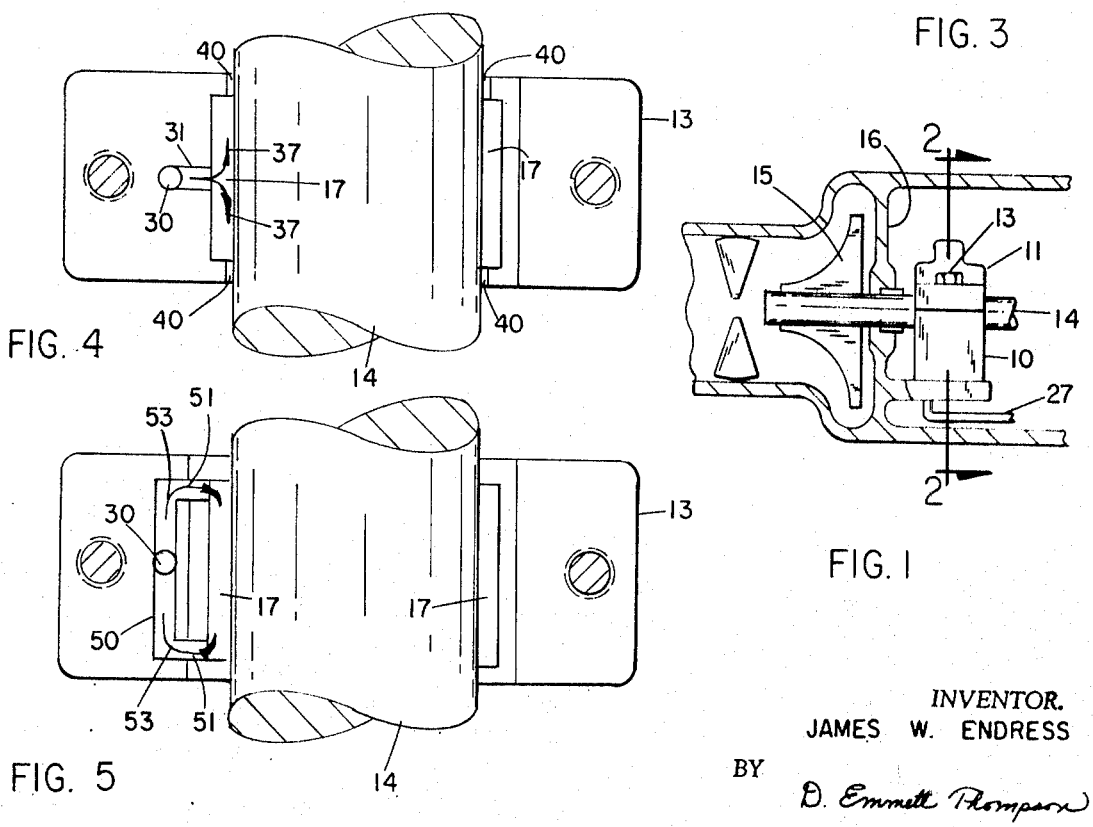
INVENTOR.
JAMES W. ENDRESS
BY
D. Emmett Thompson
ATTORNEY

BEARING STRUCTURE WITH RESERVE OIL SUPPLY

BACKGROUND OF THE INVENTION

Machine structures on occasion include a shaft journaled for high-speed rotation and carrying a substantial load. An example of such a structure is found in a centrifugal gas compression machine. Oil under pressure is supplied to the bearing. In such machines it is the usual practice to deenergize the prime mover, effecting rotation of the shaft upon failure of oil pressure to the bearing. However, under that situation, the shaft will continue to rotate during a coastdown period. Also, in the event of power failure to both the prime mover and the oil pump, the shaft will continue to rotate during the coastdown period. To avoid lack of proper lubrication for the bearing during such coastdown period, various arrangements have been employed, such for example as providing an auxiliary oil pump which comes into operation upon failure of oil pressure and continues to operate for period at least coextensive with the coastdown period. Such arrangements involve substantial cost and, in addition, are subject to failure when their use is demanded.

This invention has as an object a bearing structure in which a reserve supply of oil is maintained to provide lubrication for the bearing during such coastdown period.

SUMMARY OF THE INVENTION

The bearing bore is formed, at diametrically opposite sides, with enlargements which extend axially of the bore for the major portion of the length thereof. These enlargements are connected by a relief passage extending circumferentially in the upper half of the bearing bore. The bearing housing is provided with a reservoir located above the bearing bore, and having communication with the relief passage. The reservoir provides a reserve supply of oil for the bearing in the event of the failure of oil pressure thereto.

BRIEF DESCRIPTION OF THE DRAWINGS

FIG. 1 is a somewhat schematic, fragmentary view showing some parts in side elevation of a bearing structure embodying my invention and illustrating the journal shaft carrying an impeller of a rotary gas compression machine;

FIG. 2 is a sectional view taken on line 2—2 of FIG. 1;

FIG. 3 is a view taken on line 3—3 of FIG. 2;

FIG. 4 is a view taken on line 4—4 of FIG. 2; and

FIG. 5 is a view similar to FIG. 4 illustrating a modification of the invention.

DESCRIPTION OF THE PREFERRED EMBODIMENT

The bearing housing is illustrated in the form of a base portion 10 and a cap portion 11. The housing is formed with a bore, which may be formed directly in the base and cap portions 10 and 11, or in a bearing liner 12 mounted therein. The base 10 and cap 11 are divided on a plane extending diametrically of the bore, and the parts are joined as by capscrews 13. In FIG. 1, the shaft 14 carries an impeller 15 of a rotary gas compression machine, the impeller housing being illustrated at 16.

The surface constituting the bore of the bearing is formed, at diametrically opposite sides, with enlargements 17. The enlargements 17 extend axially of the bore the major portion of the length thereof (see FIGS. 3 and 4).

The surface is formed with a circumferentially extending relief passage 20 communicating at its ends with the enlargements 17. The passage 20 is of substantially less dimension in an axial direction than are the enlargements 17.

The cap 11 is formed with a reservoir 23 positioned above the bore of the bearing and communicating with the passage 20 by an opening 25. The bearing is supplied with oil from a line 27 which is connected to a vertically disposed passage 30 formed in the base section 10 of the bearing, and terminating in an inwardly extending passage 31 communicating with one of the enlargements 17.

Upon rotation of the shaft in a counterclockwise direction (FIG. 2) as indicated by arrow 33, the oil is drawn between the shaft journal the lower portion of the bearing bore. The oil is also directed through the passage 20 and opening 25 into the reservoir 23. In the arrangement shown in FIGS. 2, 3, and 4, the oil inlet passage 31 is located medial of the ends of the bore. In order to effect flow of the oil axially along the shaft journal toward the ends of the bore, as indicated by the arrows 37 (FIG. 4), the bore is formed with small notches 40 extending from the ends of the enlargements 17 to the ends of the bore (see FIGS. 2, 3, and 4).

Preferably, where the bearing is employed in a machine, such as a centrifugal gas compression machine employed in a refrigeration system, the top wall of the reservoir 23 is formed with a small vent orifice 43 which may be overlaid by a baffle 45 (see FIG. 2). In such refrigeration apparatus, the lubricating oil contains a certain amount of refrigerant. The heat developed in the bearing during operation of the machine could effect an evaporation of refrigerant, and the orifice 43 serves to permit the escape of the refrigerant vapor from the oil in the reservoir 23.

With the lack of high oil pressure during the coastdown period, the oil in the reservoir 23 will wet the surface of the shaft. Also, that situation results in an increase in the temperature of the bearing and shaft which in turn heats the oil in the reservoir to flash off the absorbed refrigerant from the oil. The small vent 43 serves to avoid exceedingly high pressure in the reservoir due to the flash off of the refrigerant, but the pressure is increased sufficiently to effect proper circulation of the oil in the bearing. Also, the latent heat of the flashing liquid refrigerant effects a lowering of the oil temperature and, in turn, the temperature of the bearing. As previously stated, the small notches 40 at the ends of the enlargements 17 are proportioned to provide for proper circulation of oil between the shaft journal and the bore of the bearing under normal oil pressure.

In FIG. 5, the bearing housing is formed with a passage 50 located in registration with the oil passage 30 and located radially outwardly from the bore of the bearing and extending axially thereof. The ends of the passage 50 communicate with passages 51 extending radially inwardly to the enlargement 17. With this arrangement, the oil flow is as indicated by the arrows 53 (FIG. 5) entering between the shaft journal and the bearing bore in proximity to the ends thereof. With this arrangement, the bleeding notches 40 are not necessary.

I claim:

1. A bearing structure for rotatably supporting the horizontally disposed impeller shaft of a centrifugal gas compression machine, said structure including a housing formed with a shaft receiving bore, said bore being formed intermediate its ends with radial enlargements at diametrically opposite sides thereof, said enlargements extending in a direction axially of the bore for the major portion of the length thereof, said bore being also formed in the central area of the upper portion thereof with a relief passage communicating at its ends with said enlargements, said housing having an enclosed vented oil reservoir disposed above said bore, said reservoir having an opening in the bottom wall thereof communicating with said relief passage, said bore being formed with venting notches extending in an axial direction from the ends of said enlargements to the ends of the bore, means for supplying a flow of oil under pressure to one of said enlargements for maintaining a supply of oil in said relief passage and said reservoir and for maintaining a predetermined oil level in said reservoir.

2. A bearing structure as defined in claim 1 wherein the oil supplying means is connected to one of said enlargements medial of the ends of said bore.